(12) United States Patent
Izmailov et al.

(10) Patent No.: US 7,403,482 B2
(45) Date of Patent: Jul. 22, 2008

(54) PATH PROVISIONING FOR SERVICE LEVEL AGREEMENTS IN DIFFERENTIATED SERVICE NETWORKS

(75) Inventors: Rauf Izmailov, Plainsboro, NJ (US); Subir Biswas, East Brunswick, NJ (US); Samrat Ganguly, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 1285 days.

(21) Appl. No.: 09/897,495

(22) Filed: Jul. 3, 2001

(65) Prior Publication Data
US 2003/0058797 A1  Mar. 27, 2003

Related U.S. Application Data

(60) Provisional application No. 60/243,731, filed on Oct. 30, 2000.

(51) Int. Cl.
*H04J 3/16* (2006.01)
*H04L 12/56* (2006.01)

(52) U.S. Cl. ......................... 370/238; 370/400

(58) Field of Classification Search ......... 370/229–235, 370/252–253, 351, 356, 389, 395.21, 395.32, 370/400–401, 238
See application file for complete search history.

(56) References Cited

U.S. PATENT DOCUMENTS

| | | | | |
|---|---|---|---|---|
| 5,841,758 A | * | 11/1998 | Chen et al. | 370/238 |
| 6,061,331 A | * | 5/2000 | Conway et al. | 370/232 |
| 6,236,642 B1 | * | 5/2001 | Shaffer et al. | 370/237 |
| 6,339,488 B1 | * | 1/2002 | Beshai et al. | 398/59 |
| 6,556,544 B1 | * | 4/2003 | Lee | 370/256 |
| 6,697,333 B1 | * | 2/2004 | Bawa et al. | 370/238 |
| 6,744,769 B1 | * | 6/2004 | Siu et al. | 370/395.32 |
| 6,778,496 B1 | * | 8/2004 | Meempat et al. | 370/230 |
| 6,981,055 B1 | * | 12/2005 | Ahuja et al. | 709/238 |
| 2001/0053149 A1 | * | 12/2001 | Mo et al. | 370/389 |
| 2003/0002510 A1 | * | 1/2003 | Suominen | 370/399 |
| 2003/0185153 A1 | * | 10/2003 | Kohler et al. | 370/230 |

FOREIGN PATENT DOCUMENTS

| | | | |
|---|---|---|---|
| JP | 7-212397 A | 8/1995 |
| JP | 9-186701 A | 7/1997 |
| JP | 10-84387 A | 3/1998 |

\* cited by examiner

*Primary Examiner*—Wing F. Chan
*Assistant Examiner*—Saba Tsegaye
(74) *Attorney, Agent, or Firm*—Sughrue Mion, PLLC

(57) ABSTRACT

A system and method for path provisioning in a network calculates an optimal path using a greedy algorithm with backtracking to execute service level agreements (SLAs). More specifically, a sequential path shifting (SPS) algorithm compares a cost of a suboptimal path for a present quadruplet with the cost of switching a path for a previous quadruplet configured for alteration. If the present path is already an optimal path, then no further operations are performed. However, if the cost of a suboptimal path is greater than the switching cost, the previous path is altered so that an optimal path may be configured for the present quadruplet. Otherwise, the present quadruplet maintains its existing path. The capacity of the network is iteratively adjusted to compensate for path selection. The present system may be applied to a differentiated services network or an optical network.

10 Claims, 14 Drawing Sheets

- ● transit node (13)
- ◉ source/destination node (64)
- ▬▬▬ 1244Mbps link (10)
- ─── 622 Mbps link (110)
- ─── 155 Mbps link (48)

PATH PROVISIONING FOR SERVICE LEVEL AGREEMENTS IN DIFFERENTIATED SERVICE NETWORKS

This application claims the benefit of U.S. Provisional Application No. 60/243,731, filed Oct. 30, 2000, under 35 U.S.C. § 119(e).

BACKGROUND OF THE INVENTION

1. Field of the Invention

The present invention relates to a system and method for providing paths in networks and more specifically, a system and method for executing service level agreements (SLAs) and provisioning for traffic flows in IP differentiated services networks and optical networks.

2. Background of the Invention

The prior art IP Differentiated Service (Diffserv) provides an efficient and scalable technique for providing Quality of Service (QoS) within the Internet. The prior art Diffserv is an improvement over the prior art per-flow signaling, which is unscalable due the per-flow state storage in the core network, to achieve end-to-end QoS guarantees. The prior art Diffserv technique overcomes the scalability problem of per-flow signaling by handling IP traffic as class-based aggregated flows, and differs from the prior art IntServ approach, which is based on application level flows.

In the Diffserv technique, each IP packet is categorized into one of a number of predefined Diffserv classes, and is assigned a service quality based on Diffserv class. Diffserv specifications can be implemented in a network area known as a Diffserv domain, which has edge elements where an IP packet can enter and exit the domain. A more detailed description of the Diffserv architecture is found in K. Kilkki, *Differentiated Services for the Internet*, 1999, which is incorporated herein by reference.

When the IP packet enters the domain at an edge element, the IP packet is classified at the edge element (e.g., ingress router), and marked with a Diffserv code point (DSCP) that identifies the Diffserv class of the entering IP packet. More specifically, the DSCP is encoded into the IP packet at the Class of Service/Type of Service (COS/TOS) field of the IP packet header. The IP packet is classified based on information extracted from the packet (e.g., layer-3 or layer-4).

Once the IP packet has been marked with the DSCP, the routers in the core of the Diffserv domain process the IP packet based on its Diffserv class. For example, the routers apply class-specific queuing, scheduling and routing within the core to satisfy the QoS guarantees for each Diffserv class.

However, this prior art classification system has various problems and disadvantages. For example, each Diffserv domain can individually define the scope of Diffserv classes and mechanisms by which the differentiated treatment is provided for different Diffserv classes. Thus, there is no standardization between Diffserv domains, as an IP packet may be classified and marked differently by ingress routers of different Diffserv domains.

To overcome the above-mentioned prior art problem, neighboring Diffserv domains can enter Service Level Agreements (SLAs) that can specify an amount of class-specific traffic that can be sent between domains. Class-specific policing is performed at the ingress router, and shaping is performed at the egress router to monitor and enforce the SLAs, which are discussed in greater detail below.

Further, IETF provides scheduling guidelines based on Per Hop Behavior (PHB) for a number of Diffserv classes, as disclosed in K. Nichols, S. Blake, F. Baker and D. Black, *Definition of the Differentiated Services Field (DS Field) in the IPv4 and IPv6 Headers*, IETF Request for Comments 2474, December 1998, the contents of which is herein incorporated by reference.

For any domain for an ISP, class-specific scheduling and routing are used to meet the Diffserv class performance requirements. Routers have specific scheduling mechanisms based on class-specific PHBs. For example, the EF Diffserv class requires preemptive priority scheduling to secure an extremely low tolerance to queuing, while AF classes can be processed using Weighted Fair Queuing (WFQ) with appropriate scheduling weights. However, these scheduling mechanisms are static (i.e., non-adaptive), and once set on a router interface, cannot be adjusted to compensate for a varying traffic profile of a class, and will not change with changing traffic patterns in a class.

FIG. 1 illustrates a prior art inter-domain service level agreement (SLA). As noted above, SLAs can specify the aggregated amount of traffic that can enter a domain through an ingress router. As illustrated in FIG. 1, a SLA $\lambda$ can specify the aggregated traffic from a first domain A to a second domain B via an ingress router $I_1$ in the second domain B. The first domain A estimates the SLA rate from long-term traffic measurements and SLAs with other neighbor domains. The solid arrows illustrated in FIG. 1 represent traffic flows for this SLA, while other flows are represented as dotted arrows. Additionally, the SLA parameters are used for policing at ingress routers (e.g., $I_1$) and shaping at egress routers (e.g., $E_3$).

A more specific SLA can be provided for $E_3 \rightarrow I_1$ if the portions of the traffic $\lambda$ that are travelling to different egress routers (e.g., $E_1$, $E_2$) can be specified. For example, the traffic from the first domain A that arrives at the second domain B via the ingress router $I_1$ is expected to go through the egress routers $E_1$, $E_2$, and their respective rates $\lambda_1$, $\lambda_2$ can be specified in the SLA. Those respective rates are useful for Diffserv path provisioning. However, if the first domain A cannot estimate the fine-grain flow distribution, then the SLA will not contain this information, and the first domain A will have to estimate the fine-grain flow distribution from dynamic traffic measurement.

Each ingress router $I_1$ of the second domain B uses the SLA information to compute the estimated volume of class-specific traffic between the ingress router $I_1$ and all egress routers $E_1$, $E_2$ in the same domain, to create an N×N matrix M, where N represents the number of edge routers in the domain. The (ij)-th element of the traffic matrix for a given class represents the total bandwidth used by that given class from ingress router i to egress router j. For example, as illustrated in FIG. 1, for the second domain B, element (1,1) of the matrix M equals $\lambda_1$, and element (1,2) of the matrix equals $\lambda_2$. Once constructed, the traffic matrices are used to compute the provisioning routes (e.g., paths), for each non-zero element of those matrices, and the computed paths are pinned down using multi-protocol label switching (MPLS) for Diffserv networks or multi-protocol lambda switching (MP$\lambda$S) for optical networks.

In the prior art example illustrated in FIG. 1, for the EF class, the peak rate $\lambda$ of the specification is used in the traffic matrices, whereas for the AF class, the token bucket parameters are combined into a single rate parameter (e.g., equivalent bandwidth of an SLA specification) that can be used to construct the traffic matrix M. For example, the SLA rate information for each AF SLA illustrated in FIG. 1 can be specified as $\{\lambda_p, \lambda_m, B\}$, where $\lambda_p$ is the peak bucket rate, $\lambda_m$ is the mean bucket rate, and B is the maximum burst size. If an aggregated flow is allocated with its equivalent bandwidth and the flow complies with its SLA token bucket parameters, then the IP packets of that flow are guaranteed the QoS specified by the flow. Since the equivalent bandwidth also captures the loss requirements, the loss bounds are automatically guaranteed.

In addition to PHBs, class-specific routing is also used for end-to-end intra-domain QoS for the Diffserv classes, as IP packets with Diffserv markings can be forwarded using statically provisioned end-to-end paths. In K. Nichols, V. Jacobson, L. Zhang, A *Two-bit Differentiated Services Architecture for the Internet*, IETF Request for Comments 2638, July 1999, which is incorporated herein by reference, routes for provisioned paths are centrally computed using the Bandwidth Broker, or can be computed in a distributed manner.

In the prior art path provisioning system, splitting of individual flows is applied for balancing network loads. Although flow splitting may have the advantage of increasing the total bandwidth of accepted traffic flows, flow splitting also has a disadvantage in that ensuring packet ordering for individual micro-flows is difficult with splitting. For example, per-packet layer-3 lookup and hashing may be required at the ingress routers.

The Diffserv domain (or optical domain) can be described in terms of graph space. For example, consider a directed graph G=(N,E) with N nodes and E links. For each link e of the graph G, $C_e$ represents link capacity, and $B_e$ represents the available bandwidth of the link, where $C_e \geq B_e$. Further, each element (i.e., traffic flow) of the traffic matrix (e.g., SLA matrix) is a triplet (r,s,d), where s is an ingress node, d is an egress node and r is traffic rate from ingress node s to egress node d. The triplets are referred to as $T(i)=(r_i, s_i, d_i)$, where i=1, . . . , K and K is the total number of triplets (i.e., non-zero elements of traffic matrix). Some triplets (i.e., flows) may be accepted, and while other triplets may be rejected due to a lack of available bandwidth or available wavelengths for optical networks.

When provisioning paths with the above-described triplets, three criteria must be considered for optimal path provisioning. First, the flow blocking rate $\overline{R}$ is minimized according to Equation (1):

$$\overline{R}=R/K \quad (1)$$

where R represents the number of rejected triplets $T(j_1)$, . . . ,$T(j_R)$, and K represented the total number of triplets.

Second, the traffic acceptance rate $\overline{V}$ is maximized according to Equations (2)-(4):

$$\overline{V} = V/W \text{ where} \quad (2)$$

$$V = \sum_{i \notin \{J_1,...,J_R\}} r_i \text{ and} \quad (3)$$

$$W = \sum_{i \notin \{J_1,...,J_R\}} r_i \quad (4)$$

V represents the total amount of bandwidth of accepted flows, and W represents the total amount of bandwidth of all flows.

Third, we minimize the hop-bandwidth product C according to Equation (5):

$$C = \sum_{i \notin \{J_1,...,J_R\}} r_i h_i \quad (5)$$

where $h_i$ is the number of hops in the path for the accepted triplet T(i) and as noted above, $r_i$ is the traffic rate for the accepted triplet.

The performance metrics $\overline{R}$, $\overline{V}$ and C are conflicting targets: since flows have different bandwidth requirements, there is usually a choice of accepting fewer "large" flows at the expense of more "small" flows or vice versa. Further, because accepted bandwidth directly translates to the revenue earned by the ISP, the first priority is to maximize the traffic acceptance rate $\overline{V}$ by deciding which flows are accepted and which flows are rejected. The second priority is to minimize the hop-bandwidth product C.

To accomplish path provisioning, in the prior art naive algorithm (NA), the ith edge router first computes traffic vectors to the other (N−1) edge routers. Each traffic vector corresponds to the ith row of the traffic matrix (i.e., SLA information) of the domain. If the SLA information is not locally available at the ith edge router, a central SLA manager downloads the relevant SLA specifications to the ith edge router. Then, independently of other routers, each edge router computes and pins down the provisioning paths to all other edge routers in the domain.

To implement the NA, the prior art steps illustrated in FIG. 2 are performed. In a first step S1, a Diffserv class is selected, and triplets T(i) for the selected given class are listed in an arbitrary sequence. In a second step S2, a first triplet is selected from the arbitrary list. In a third step S3, all links where $B_e$ is less than $r_i$ (i.e., there is not enough bandwidth to use the link) are pruned to define a subnetwork, and in a fourth step S4, for the selected triplet $T(i)=(r_i, s_i, d_i)$, the minimum-hop path P is computed from $s_i$ to $d_i$ in the subnetwork that satisfies the current bandwidth availability of the network (i.e., $B_e > r_i$) for each link e in the path P. In a fifth step S5, it is determined whether the shortest path P exists. If the shortest path P does not exist, then T(i) is rejected in the sixth step S6. If the shortest path P exists, T(i) is accepted in the next step S7, and in the following step S8, $B_e$ is recomputed for each link e in the path P, and $B_e$ is adjusted as follows: $B_e = B_e - r_i$. In the next step S9, the next triplet T(i) is selected from the list, and this prior art process is repeated. The NA may then be repeated for each class not yet selected.

The prior art NA is a benchmark for evaluating the benefits of using a centralized QoS server to handle path provisioning computations. The performance of the NA approximates that of distributed path provisioning, where edge routers select paths for their respective traffic flows independently of each other, and the bandwidth availability information is propagated to the routers by QOSPF protocol.

A QoS server can coordinate the order and manner of path selection. Some prior art work has been done on single path routing service in the context of telephone networks and virtual private network, as the routing algorithms used in these networks depend on specific switching equipment provided by manufacturers. For example, F. Lin and J. Wang, "*A Minimax Utilization Routing Algorithm in Networks with Single-Path Routing,*" Proceedings of IEEE Globecom'93. 1993, the contents of which is incorporated herein by reference, discuss the scenario use of single path routing to minimize the maximum link utilization factor. Lin and Wang describe this as a linear programming problem using Lagrangian Relaxation for obtaining suboptimal solutions.

The prior art QoS server-based algorithm referred to as an iterated sorting (IS) algorithm is illustrated in FIG. 3. In the prior art IS algorithm, the class is selected in a first step S10, as in the prior art NA. In a second step S11, the triplets are sorted in terms of the first field (i.e., the rate). It is assumed that the triplets $T(i)=(r_i, s_i, d_i)$ satisfy the condition $r_1 \geq r_2 \geq \ldots \geq r_k$, where K is the total number of triplets with non-zero rates (i.e., SLA entries). The sorted list is then handled in the same manner as steps S2 through S9 of the prior art naive algorithm, in a third step S12.

In each iteration, the IS algorithm picks the largest (in terms of bandwidth required) flow from the list of non-rejected flows and attempts to fit the selected flow into the network. The algorithm may be suboptimal, as illustrated in FIG. 4. For example, all the links of the network illustrated in FIG. 4 have available capacity of 10 units, and there are only two triplets in the SLA: (6,5,6) and (5,1,4). Provisioning the path (5,2,3,6) for the first triplet (6,5,6) blocks the second triplet, (5,1,4). However, because of the sequential nature of the prior art algorithms, there is no mechanism to reverse the already provisioned paths. This is a problem inherent in the prior art IS and NA methods.

The prior art algorithms have various problems and disadvantages. As pointed out in C. Frei and B. Faltings, "*Abstraction and Constraint Satisfaction Techniques for Planning Bandwidth Allocation*", Proceedings of IEEE Infocom, 2000, the contents of which is incorporated herein by reference, the path-provisioning problem is NP-hard and should be attacked by heuristic algorithms. The prior art naive algorithm and iterated sorting algorithms only provide sequential solutions, and do not disclose or suggest any other solution for the path-provisioning problem.

SUMMARY OF THE INVENTION

It is an object of the present invention to overcome the problems and disadvantages of the prior art.

It is another object of the present invention to provide a method of path provisioning (i.e., computing routes) for intra-domain Diffserv traffic that satisfies a service level agreement (SLA).

It is another object of the present invention to provide a method of path provisioning (i.e., computing routes) for intra-domain optical traffic that satisfies a traffic matrix.

It is still another object of the present invention to maximize the traffic acceptance rate $\overline{V}$.

It is yet another object of the present invention to minimize the cost (i.e., hop-bandwidth product) C.

To achieve the aforementioned objects, a method of generating an optimal path in a domain is provided, comprising the steps of estimating a traffic volume of said domain, constructing a traffic matrix in accordance with said estimated traffic volume, computing a provisioning route for each non-zero element of said traffic matrix, wherein said method is performed for at least one class in descending order of priority, and said provisioning route is open to alteration, and readjusting said traffic matrix in response to said computed provisioning route.

Additionally, a method of calculating an optimal path of a network is provided, comprising the steps of selecting a highest non-selected class from a plurality of differentiated service classes, listing all quadruplets for said selected class, wherein each of said quadruplets comprises a path having a source, a destination, a rate between said source and said destination, and an indicator of path alterability, wherein said quadruplets are sorted according to said rate, and selecting a first quadruplet that has not been rejected. The method also comprises computing an optimal path between said source and said destination on a subnetwork of said network that comprises all paths meeting bandwidth availability requirements for said first quadruplet. The computing step comprises calculating an ideal shortest path and a number of hops in said ideal shortest path H for said first quadruplet, calculating a shortest available path and a number of hops in said shortest available path H* for said first quadruplet, calculating a sub-optimality cost in accordance with the rate, said H and said H*, and one of accepting said shortest available path for said first quadruplet if said sub-optimality cost of said first quadruplet equals zero, and performing backtracking to determine if said ideal shortest path of said first quadruplet is feasible if said sub-optimality cost of said first quadruplet is greater than zero. The backtracking step comprises, creating a matrix that comprises a previous quadruplet configured for alteration and having all links between said source and said destination of said previous quadruplet in said subnetwork, one of (i) accepting said available shortest path of said first quadruplet if said matrix is empty, (ii) calculating a minimum value of a shifting cost of said previous quadruplet in accordance with said rate of said previous quadruplet in said subnetwork and a difference between a number of hops in said current path and said altered path for said previous quadruplet in said matrix and if said matrix is not empty, and (iii) accepting said available shortest path if said minimum shifting cost of said previous quadruplet exceeds said sub-optimality cost of said first quadruplet, wherein said altered path for said previous quadruplet is generated by deleting said previous quadruplet and adding said first quadruplet, and if said minimum shifting cost for said first quadruplet exceeds said sub-optimality cost for said previous quadruplet, routing said previous quadruplet on a new path P* and resetting said available shortest path for said previous quadruplet to said new path P*, routing said first quadruplet on said shortest ideal path for said first quadruplet and resetting said available shortest part to said shortest ideal path for said first quadruplet, and configuring said first quadruplet to not be altered. The method also comprises adjusting bandwidth availability of said network in accordance with said optimal path.

Further, a network for path provisioning of an SLA is provided, comprising a plurality of edge nodes that one of receive and transmit a prescribed amount of traffic in accordance with said SLA, and a plurality of links that couple receiving and transmitting edge nodes to one another, each of said links having a maximum capacity, wherein an optimal path is calculated for a current suboptimal path by resetting a previously calculated path if a cost of said resetting step for said previously calculated path is less than a cost of suboptimality for said current suboptimal path.

BRIEF DESCRIPTION OF THE DRAWINGS

The accompanying drawings, which are included to provide a further understanding of preferred embodiments of the present invention and are incorporated in and constitute a part of this specification, illustrate embodiments of the invention and together with the description serve to explain the principles of the drawings.

DETAILED DESCRIPTION OF THE INVENTION

Reference will now be made in detail to the preferred embodiment of the present invention, examples of which are illustrated in the accompanying drawings. In the present invention, the terms are meant to have the definition provided in the specification, and are otherwise not limited by the specification.

The present invention provides a heuristic algorithm and more specifically, a greedy algorithm with backtracking, referred to as a sequential path shifting (SPS) algorithm, in a method for path provisioning in a Diffserv or optical network. More specifically, the present invention provides for intra-domain path provisioning that satisfies the SLA. It is assumed that equivalent bandwidth computation is based on local policies and algorithms within the Diffserv domain, and that class-specific resource partitioning, scheduling and AF QoS requirements are uniform within the domain and known to all routers in the domain.

In the preferred embodiments of the present invention, the path provisioning method is performed separately for each Diffserv class in a sequential manner, from the most stringent class (e.g., EF) to the least stringent class (e.g., AF-4). For example, the provisioned paths for EF are computed and pinned down, the amount of remaining available bandwidth is adjusted by subtracting the amounts of reserved for EF from the available capacity of the links, and the same steps are performed for each of the remaining Diffserv classes. Thus, while the preferred embodiments of the present invention are discussed in terms of a given Diffserv class, it is understood that the preferred methods can be applied to each of the Diffserv classes in a sequence. Further, the present invention may also be applied to optical networks.

In the preferred embodiment of the present invention, various Diffserv classes may be included, as shown in Table 1 below:

TABLE 1

| Diffserv Classes | Performance Bounds | Application |
| --- | --- | --- |
| Expedited Forwarding | Very low delay/jitter Very low loss ($10^{-9}$) | TDM Circuit Emulation |
| Assured Forwarding—1 | Low delay/jitter Low loss ($10^{-6}$) | CD quality audio Broadcast quality video |
| AF2 | Low delay Low loss ($10^{-4}$) | IP Telephony (voice and video) |
| AF3 | Loss ($10^{-3}$) | E-Commerce |
| AF4 | Loss ($10^{-2}$) | Web Trading FTP Telnet Non-critical Web Applications |

TABLE 1-continued

As in the prior art IS algorithm, the SPS algorithm uses the list of triplets sequentially sorted in terms of the first field (i.e., the rate). A decision is made whether to accept each triplet T(i), which may involve changing the paths of already accepted triplets (i.e., backtracking). To incorporate this backtracking method, each triplet T(i) is expanded to a quadruplet T(i) by adding an extra bit b. The bit b indicates whether the provisioned path for the flow can be altered by subsequent flows. In the beginning, the bit is set as TRUE in for all quadruplets (i.e., the paths for all flows can be altered).

Figure 1:
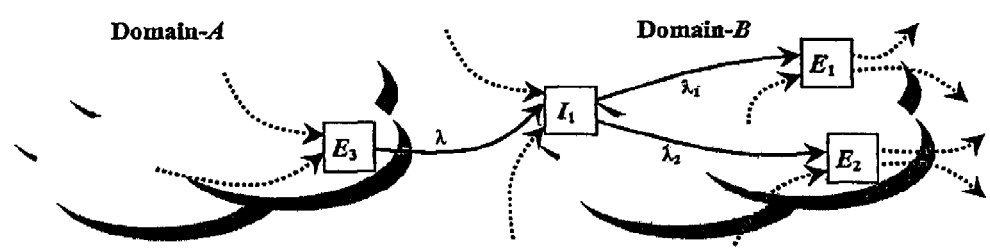
FIG. 1 illustrates a prior art inter-domain service level agreement (SLA)
Figure 2:
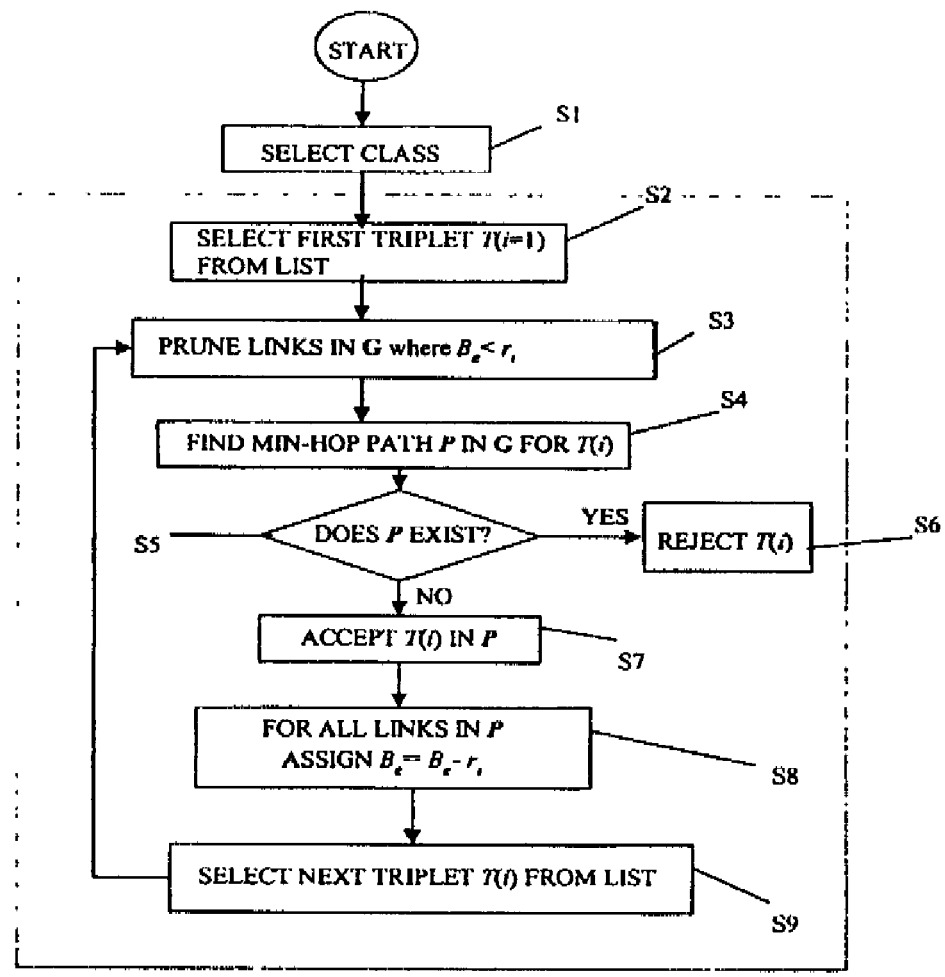
FIG. 2 illustrates a prior art naive algorithm for a method of path provisioning.
Figure 3:
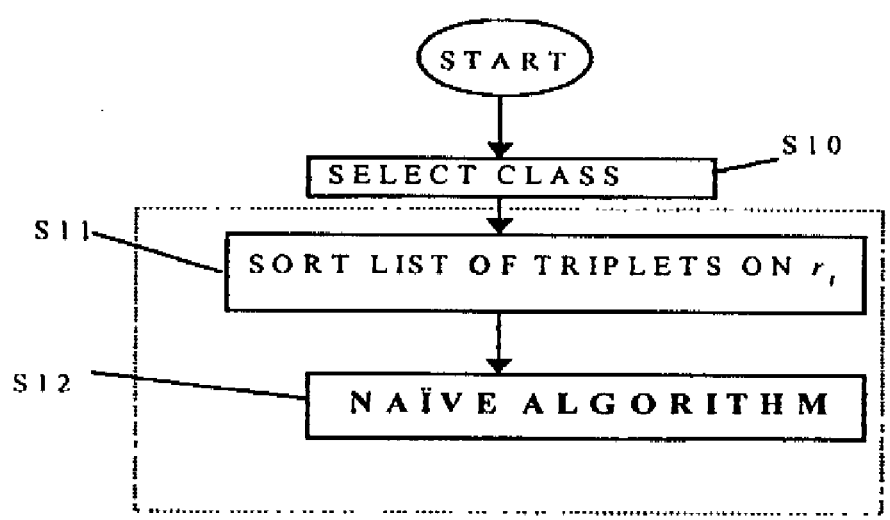
FIG. 3 illustrates a prior art iterative sorting algorithm for a method of path provisioning.
Figure 4:
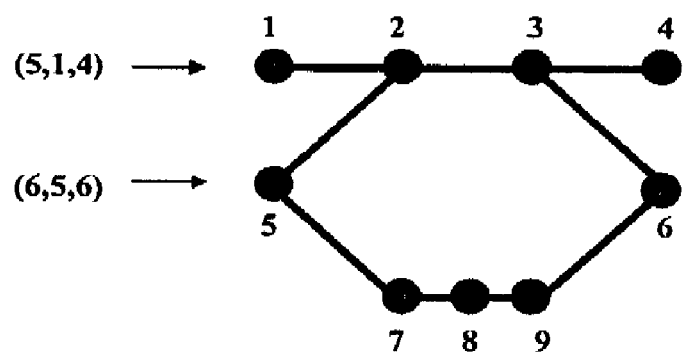
FIG. 4 illustrates an example of the suboptimality of the IS method.

The preferred embodiment of the present invention prevents blocking of the second triplet (5,1,4) illustrated in FIG. 4 by backtracking and reversing the sequence of paths to be provisioned, in a sequential path shifting (SPS) algorithm. In the first step, the triplet (5,1,4) is accommodated with the path (1,2,3,4). Then, in the second step, the triplet (6,5,6) is routed along the path (5,7,8,9,6). Thus, the SPS algorithm is a greedy algorithm with backtracking, as described in greater detail below.

Given a graph G, for each triplet $T(i)=(r_i,s_i,d_i)$, two possible paths exist. First, the ideal shortest path (SPI(i)) is the shortest path in G from $s_i$ to $d_i$ such that for all links e in the path, $C_e \geq r_i$. In other words, SPI(i) is the shortest path in the absence of bandwidth reservations of other triplets. Second, the available shortest path (SPA(i)) is the shortest path in G from $s_i$ to $d_i$ such that for all the links e in the path, $B_e \geq r_i$. In other words, SPA(i) is the shortest path in the presence of bandwidth reservations of other triplets.

For any path p carrying the bandwidth reservation r, there are two possible operations, Add and Del. First, in Add(G,p,r), for each link e in the path p, the available bandwidth $B_e$ is decreased by r according to ($B_e:=B_e-r$). In other words, Add (G,p,r) adjusts the available bandwidth in G to reflect the reservation of bandwidth amount r along the path p. Second, in Del(G,p,r): for each link e in the path p, the available bandwidth $B_e$ is increased by r according to ($B_e:=B_e+r$). In other words, Del(G,p,r) adjusts the available bandwidth in G to reflect the release of bandwidth amount r along the path p.

Figure 5:
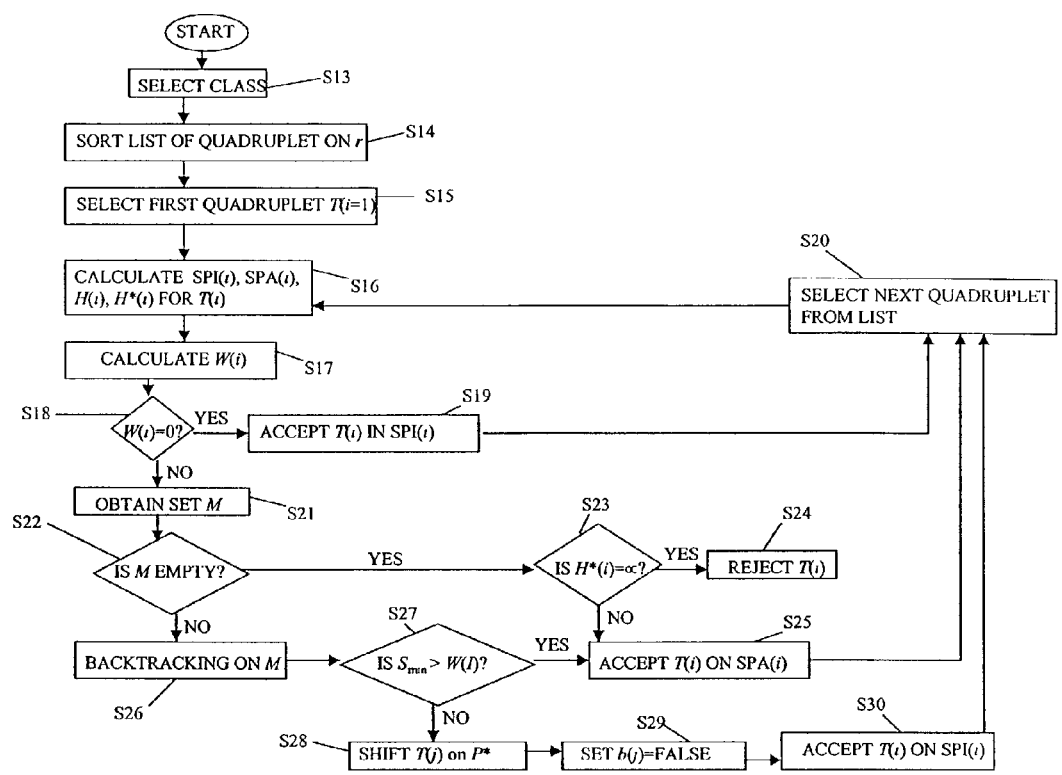
FIG. 5 illustrates a method applied at a router according to a preferred embodiment of the present invention that applies the sequential path shifting (SPS) algorithm for a method of path provisioning.

FIG. 5 illustrates a method for the sequential path shifting (SPS) algorithm according to the preferred embodiment of the present invention. For i=1, . . . , K, the SPS algorithm sequentially tries to find a path from the ingress to the egress for the ith quadruplet with backtracking. In a first step S13, a class is selected. In the preferred embodiment of the present invention, this is the class having a highest priority that has not yet been selected. In a second step S14, the quadruplets T(i) in the selected class are sorted based on the rate r. In a third step S15, a first quadruplet $T(i)=(r_i,s_i,d_i,b_i)$ is selected (i.e., T(1)), for which the path has to be computed. In a fourth step S16, SPI(i), SPA(i), $H_i$ and $H^*_i$, where $H_i$ and $H^*_i$ denote the number of hops in SPI(i) and SPA(i), respectively, are calculated. If SPA(i) is not defined (i.e., there is not enough bandwidth in the network to route the $i^{th}$ flow), $H^*_i$ is set to infinity. The difference between $H^*_i$ and $H_i$ represents the number of hops by which SPA(i) exceeds the optimal path SPI(i).

Next, in a fifth step S17, the sub-optimality cost W(i) is calculated as $r_i(H^*_i-H_i)$. The sub-optimality cost W(i) represents the amount of additional bandwidth used by the $i^{th}$ flow, compared to the optimal path SPI(i). In a next step S18, it is determined whether W(i) equals zero. If W(i) is zero (i.e., the available path uses the same amount of bandwidth as the ideal one and thus, SPA(i) is SPI(i)), the path SPA(i) is accepted for T(i) in the next step S19, and the next quadruplet is selected from the list in the following step S20.

If W(i) does not equal zero, the path SPI(i) cannot be used to accommodate the $i^{th}$ flow because for at least one of the links e in SPI(i), the available bandwidth $B_e$ is less than the flow rate $r_i$. The set of all such links e is denoted by Q, where $Q=\{e:e \in SPI(i); B_e < r_i\}$. If no other flows are present in the network, all links of SPI(i) can accommodate flow rate $r_i$. However, because paths have already been provisioned during the previous (i−1) steps, some of the links of SPI(i) (i.e., those belonging to Q) do not have the available bandwidth necessary to support the flow rate $r_i$.

Accordingly, in the next step S21, M is defined as the subset of those already accepted (i.e., during the previous i−1 steps) quadruplets T(1), ..., T(i−1) for which the following two conditions hold true. First, the bit $b_j$ of quadruplet is TRUE and the path SPA(j) thus can be altered. Second, all links e in Q belong to the path SPA(j): $Q \subset SPA(j)$. Therefore, if the bandwidth reservation for $r_j$ of the quadruplet T(j) for its path SPA(j) is removed, the available bandwidth at each link e in Q increases by $r_j$. Since the $i^{th}$ flow requires bandwidth reservation of $r_i \leq r_j$, this increase is sufficient for accommodating the $i^{th}$ flow using its path SPI(i).

Next, in step S22, the system determines whether M is empty. If M is empty and SPA(i) is defined (i.e., H*(i) is not equal to infinity), as shown in step S23, the current path of SPA(i) is accepted as the path for the $i^{th}$ flow in step S25 (i.e., the path is sub-optimal, but there is no single path that can be removed to accommodate it), and the next quadruplet is selected in step S20. Otherwise, the $i^{th}$ flow is rejected in step S24.

Figure 6:
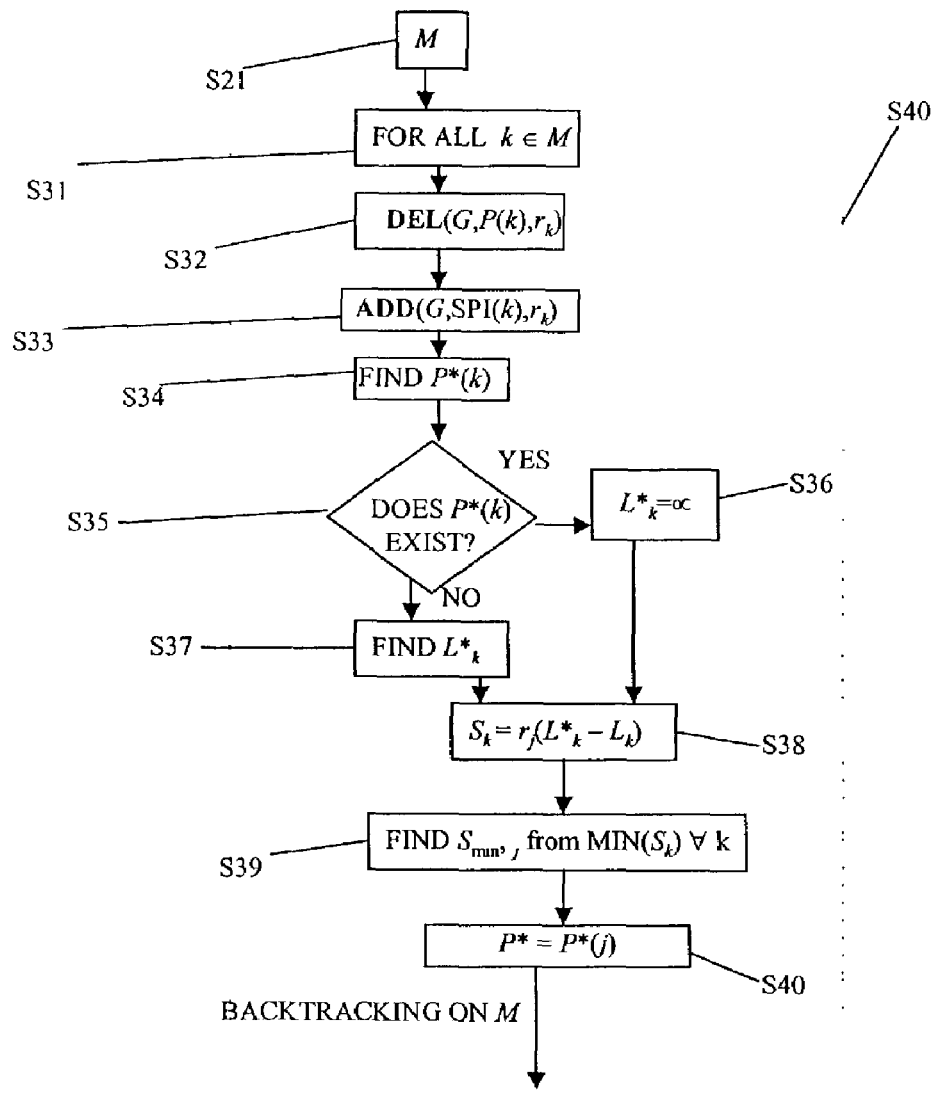
FIG. 6 illustrates a backtracking method for the SPS algorithm for a method of path provisioning.

If M is not empty, then backtracking is performed on M in step S26. The backtracking algorithm is illustrated in FIG. 6. In backtracking, elements can accommodate the $i^{th}$ flow as follows. Once M has been defined in step S21 and backtracking is to be performed based on step S22, for each previously processed quadruplet T(k) of the set M as defined in step S31, its path SPA(k) contains all the links in Q. Therefore, removing the path SPA(k) from the network by releasing the bandwidth reserved for T(k), permits the ith flow to be accommodated on the path SPI(i) in step S32 by obtaining G* for T(k) from G by first performing Del(G,P(k),$r_k$) in step S32 and then Add(G,SPI(i),$r_i$) in S33. Those operations reflect the result of deleting the bandwidth provisioning for T(k) and adding the bandwidth provisioning for T(i). In step S34, P*(k) is defined as the new path for T(k).

In a step S35, it is determined whether P*(k) exists. If path P*(k) does not exist, we set $L^*_k$ to infinity in the step S36. If P(k) does exist, we define $L^*_k$ as the number of hops in the path P*(k) calculated in G*, as calculated in step S37.

The removed quadruplet T(k) has to be routed again, and its new altered route may be longer than the one scheduled originally. In step S38, for each quadruplet T(k) of this set (k∈M), we define the shifting cost $S_k$ as $r_k(L^*_k - L_k)$ where $L_k$ is the number of hops in the current path P(k) for the quadruplet T(k), and $L_k$ is calculated as described above.

In step S39, $S_{min}$ is determined as the minimum of all the shifting costs $S_j$, achieved for some j in m. Accordingly, P*=P*(j) is determined in step S40. Depending on which is larger, $S_{min}$ or W(i), one of steps S25 and S28 is taken as described above with respect to FIG. 5.

The remaining steps after the backtracking step S26 are illustrated in FIG. 5. Once the backtracking step S26 has been completed, the following step S27 determines whether $S_{min}$, which is the minimized cost of shifting the path of the previously processed quadruplet T(j), exceeds the suboptimality cost W(i) for the current selected quadruplet W(i). If so, then it is less costly to accept the current path T(i) on SPA(i), which is done in step S25, and the path for the previously processed quadruplet T(j) is not changed. Then, the next quadruplet is selected as illustrated in step S20.

If $S_{min}$ is less than or equal to W(i), then the shifting cost of the previously processed quadruplet T(j) is smaller than the sub-optimality cost W(i) of the currently selected quadruplet T(i). In that case, the quadruplet T(j) is routed on the path P*(j) and SPA(j) is reset to P*(j) in the step S28. If the shift of T(j) results in a path longer than $L_m$ (i.e., the number of hops in the path P(j) for the quadruplet T(j) before the shifting), the bit $b_i$ of the quadruple T(i) is set to FALSE in the step S29 to prevent the shifting of SPA(i) by subsequent flows (i+1, ..., N) and simplify the algorithm (i.e., if SPA(i) can be shifted by a subsequent flow T(k), the altered path for the quadruplet T(j) can be changed again). The quadruplet T(i) is then routed on the path SPI(i), and SPA(i) is reset to SPI(i) in the next step S30.

Figure 7:
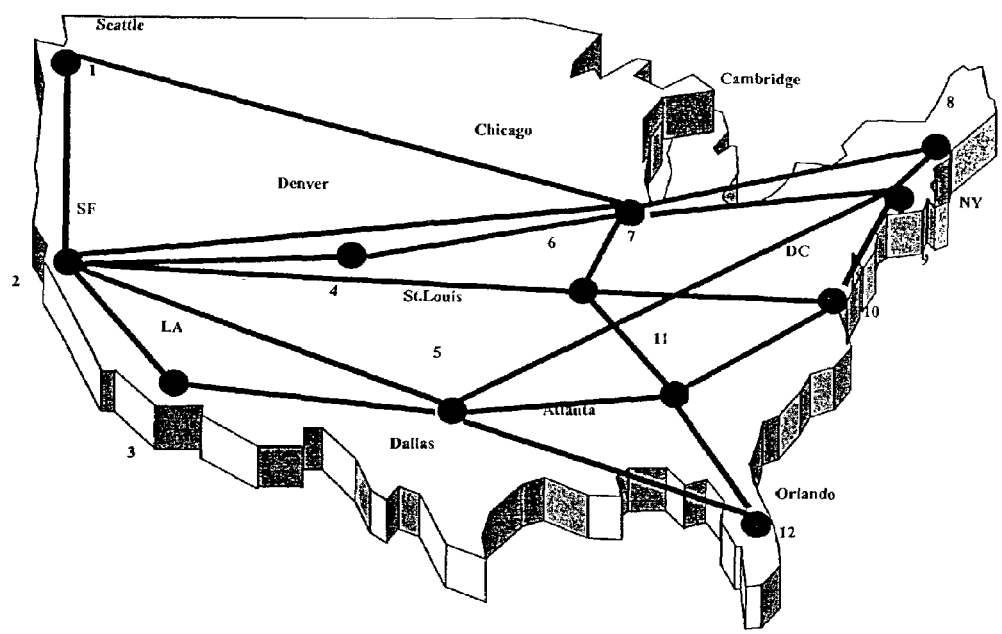
FIG. 7 illustrates the physical topology of the IP backbone.

In experimentation, the performance of the prior art NA and IS algorithm are compared to the SPS method of the present invention for two networks under various loading conditions, as discussed below. FIG. 7 illustrates the physical topology of the IP Backbone, which consists of 12 nodes. It is assumed that every link can carry 10 units of bandwidth. Seattle (1), San Francisco (2) and Los Angeles (3) were selected as sources, and Cambridge (8), New York (9) and Washington, DC (10) were selected as destinations.

Each source generated three flows to all three destinations, which created nine flows in total. The traffic rate of each flow was randomly distributed on the interval (0,10ρ), where ρ is a scale parameter that is varied form 0 to 1. The average traffic rate of each flow is thus equal to ρ/2. Nine different values of ρ (namely, ρ=0.1, ρ=0.2, ..., ρ=0.9) were tested, and for each value of ρ, we ran all three algorithms (NA, IS and SPS) 15 times and computed the average traffic acceptance rate R, defined as the average accepted traffic volume R normalized by the total traffic volume (which is 9ρ/2 in this particular example), average flow rejection rate V, defined as the average number V of rejected traffic flows normalized by the total number of traffic flows (which is 9 in this particular example), and average hop-bandwidth product C, defined as the average hop-bandwidth product of accepted flows.

For this series of experiments, a fourth algorithm, the brute force one (referred to as BF) was also used. While the performance of NA provides a lower bound of performance, the performance of BF algorithm provides a useful upper bound. We used BF algorithm in the series of experiments to calculate the same performance metrics as for NA, IS and SPS.

Figure 8A:
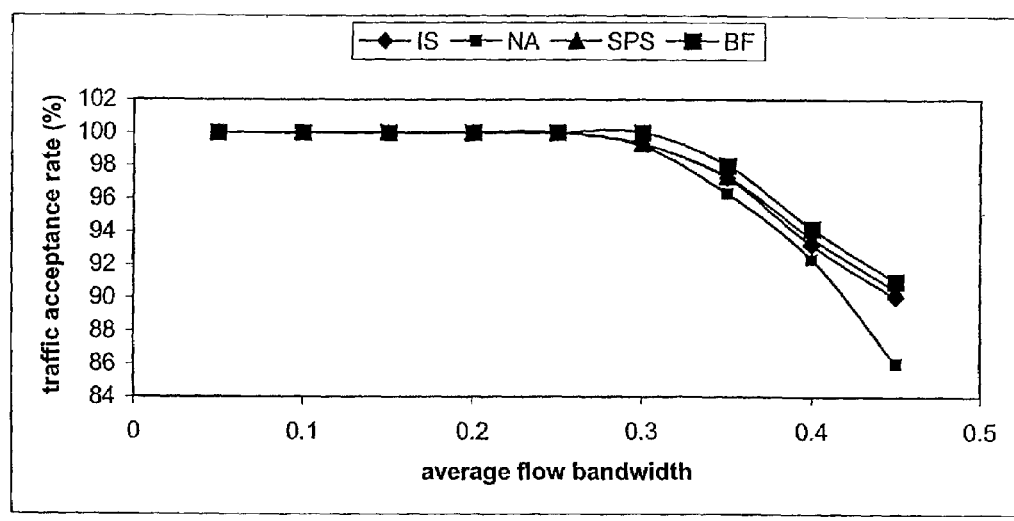
FIGS. 8(a)-8(c) respectively illustrate traffic acceptance rate, flow blocking rate and hop-bandwidth product for experimental results for the preferred embodiment of the present invention as applied to the IP backbone.
Figure 8B:
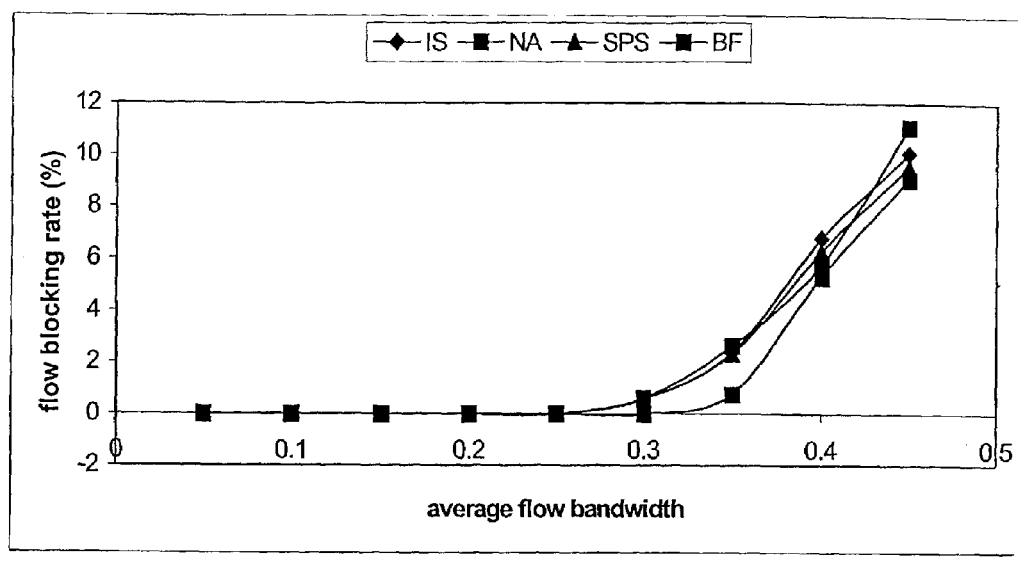
Figure 8C:
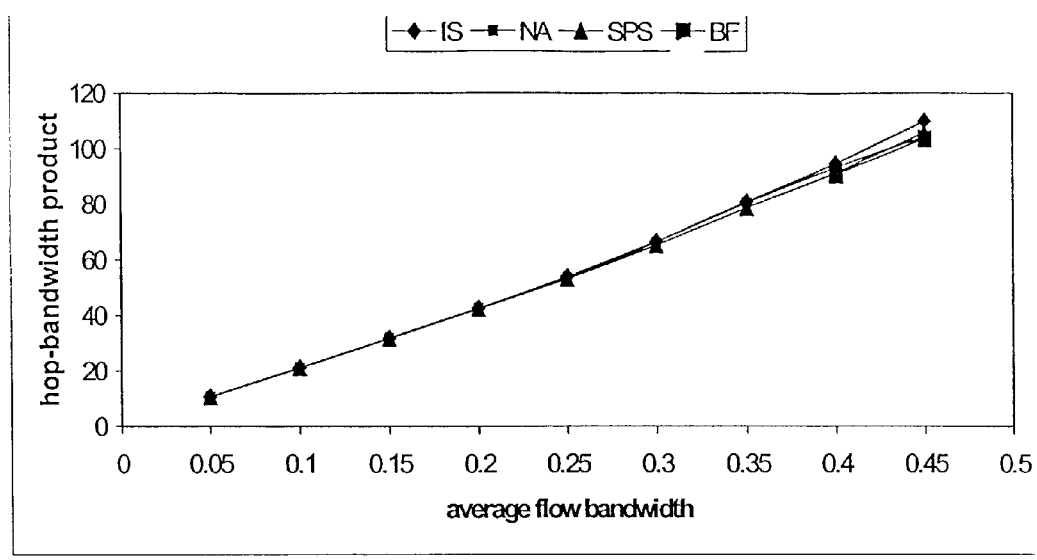

FIGS. 8(a)-8(c) illustrate the results of the experiments. For small values of ρ, there is little difference in all three performance metrics. In other words, for small loads, all algorithms perform about the same. However, as the average flow requirement reaches 0.3 and the overall load on the system increases, differences in performance emerge.

In terms of average traffic acceptance rate (a primary target performance metric) a visible difference exists between the decentralized NA algorithm and the centralized IS, SPS and BF algorithms, as illustrated in FIG. 8(a). The relative difference among IS, SPS and BF algorithms is relatively smaller.

Within the set of these algorithms, SPS performs better than IS, and BF performs better than SPS. The difference between BF and SPS is small, which indicates that the performance of SPS is substantially closer to the performance of the optimal BF algorithm.

In terms of flow blocking rate (a secondary performance metric), the relationship between NA and other algorithms (IS, SPS and BF) is reversed: NA accepts, on average, more flows than other algorithms, as illustrated in FIG. 8(b). The reason for this reversal is the tradeoff between traffic acceptance rate and flow blocking rate: IS, SPS and BF accommodate more traffic volume by accepting fewer flows with larger bandwidth requirements.

Finally, in terms of hop-bandwidth product (a third performance metric), there is hardly any difference between the algorithms, as illustrated in FIG. 8(c).

Figure 9:
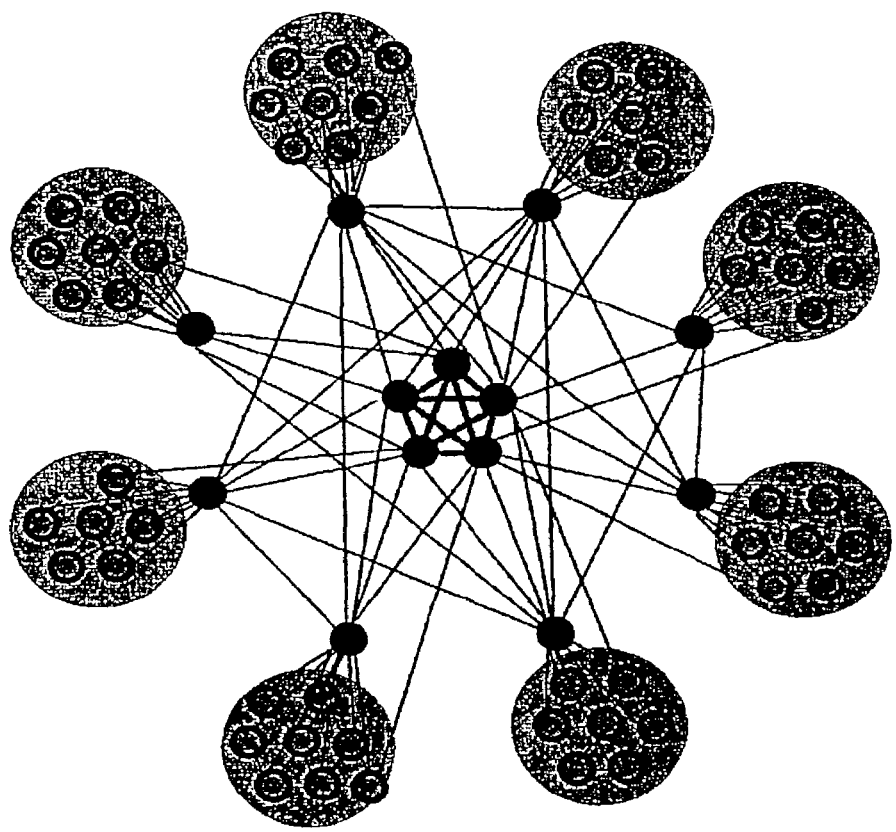
FIG. 9 illustrates the physical topology of the Kyoto University network.

In addition to the IP Backbone network illustrated in FIG. 7, the Kyoto University network illustrated in FIG. 9 was used. The Kyoto University network consists of 5 core nodes fully connected by 10 logical links of 1244 Mbps capacity. It is noted that a logical link consists of two parallel physical links of 622 Mbps each. The core nodes are connected to the gateway nodes (i.e., switches) of 8 domains (i.e., departments) with links of 622 Mbps. Inside each domain, there are 8 to 10 (normal) nodes, interconnected with 155 Mbps links. Some of these normal nodes have direct connections to the 5 core nodes via 622 Mbps links, bypassing the corresponding gateway node. These normal nodes (with direct connections to the core nodes) are called bypass nodes, and each domain has exactly one bypass node. Traffic was sent from each intra-domain node to every other intra-domain node (there are 64 intra-domain nodes in Kyoto University network). The traffic intensity depends on the relationship between the source and destination nodes. For example, 50% of the traffic is intra-domain traffic, whereas the other 50% of the traffic goes uniformly to the other seven domains. Since the Kyoto University network illustrated in FIG. 9 is not symmetrical, this arrangement leads to dissimilar traffic loading on different links of the network.

Figure 10A:
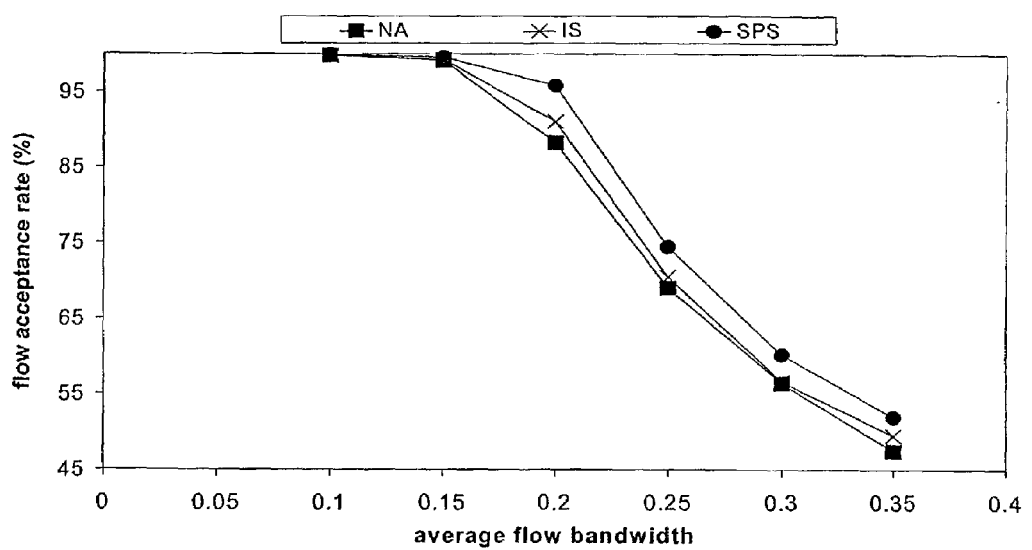
FIGS. 10(a)-10(c) respectively illustrate traffic acceptance rate, flow blocking rate and hop-bandwidth product for experimental results for the preferred embodiment of the present invention as applied to the Kyoto University network.
Figure 10B:
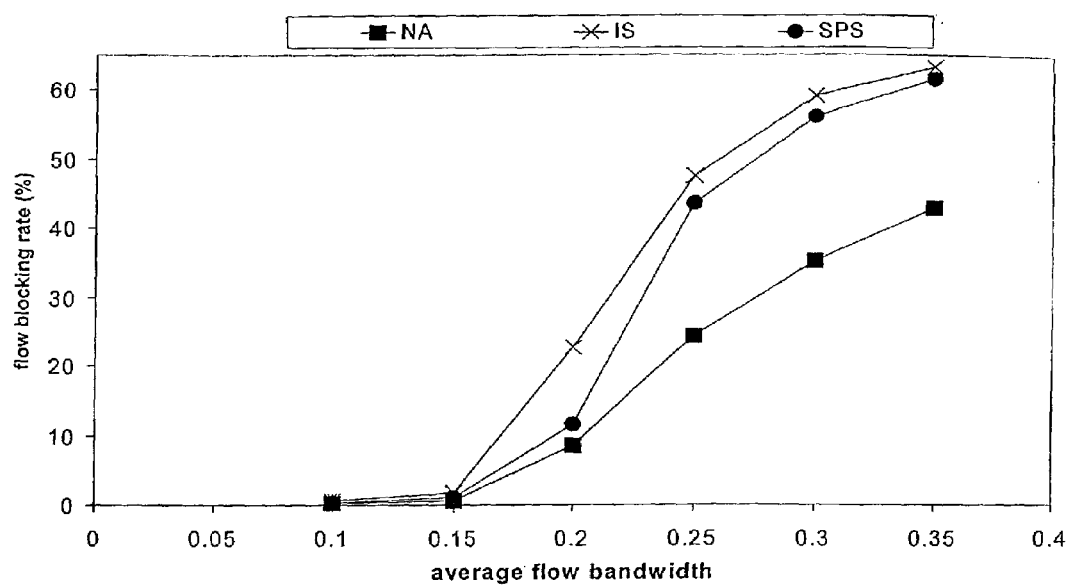
Figure 10C:
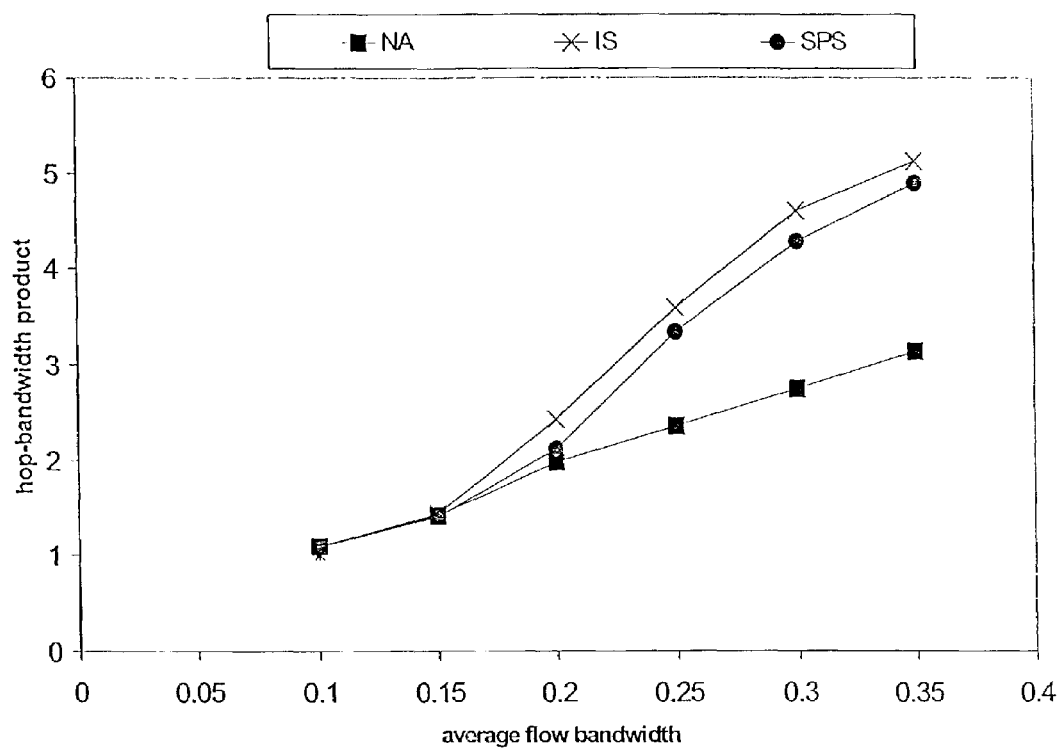

The experiments for the Kyoto University network of FIG. 9, with the resulting 64×64 traffic matrix, are illustrated in FIGS. 10(a)-10(c). The relative performance of the algorithm follows the same pattern observed in our experiments with IP Backbone. In particular, the SPS algorithm delivers the best traffic acceptance rate, closely by IS.

The experimental results demonstrate the value of handling the path provisioning problem by a centralized QoS server, and an advantage in that the performance of one of the SPS algorithm (i.e., greedy algorithm with backtracking) can be very close to optimal, while being computationally feasible.

The present invention has various advantages that overcome the prior art problems and disadvantages. For example, flow splitting is not required and thus, the problems and disadvantages of flow splitting are overcome. In the present invention, for each element in a traffic matrix, only one ingress-to-egress path is chosen and subsequently pinned down.

It is another advantage of the present invention that path provisioning in the intermediate stages of the procedure can be reversed by consequent steps and thus, the problems and disadvantages of sequential path provisioning are overcome. Further, the present invention can be implemented on a centralized device (a QoS server) and thus improve the performance.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A method of generating an optimal path in a domain, comprising:
   estimating a traffic volume of said domain;
   constructing a traffic matrix in accordance with said estimated traffic volume;
   computing a provisioning route for each non-zero element of said traffic matrix, wherein said method is performed for at least one class in descending order of priority, and said provisioning route is open to alteration, said computing including listing and sorting all quadruplets for said at least one class, wherein each of said quadruplets comprises a path having a source, a destination, a rate between said source and said destination, and an indicator of path alterability; and
   readjusting said traffic matrix in response to said computed provisioning route, wherein said method is for executing service level agreements (SLAs) and provisioning for traffic flows in networks.

2. The method of claim 1, wherein said domain comprises one of an IP backbone network and a network having a plurality of core nodes connected via logical links to gateway nodes of neighboring domains and at least one bypass node connected to at least one of said core nodes.

3. The method of claim 1, further comprising evaluating cost benefits of reversing a path of at least one previously provisioned flow.

4. The method of claim 1, further comprising maximizing a traffic acceptance rate, and minimizing a hop-bandwidth product.

5. The method of claim 1, said computing step comprising:
   selecting a first quadruplet that has not been rejected; and
   computing an optimal path between said source and said destination on a subnetwork that comprises all paths meeting bandwidth availability requirements for said first quadruplet, said computing step comprising one of (i) accepting a shortest available path for said first quadruplet if a sub-optimality cost of said first quadruplet equals zero, and (ii) performing a backtracking step to determine if an ideal shortest path of said first quadruplet is feasible if said sub-optimality cost of said first quadruplet is greater than zero.

6. The method of claim 5, said computing step further comprising:
   calculating said ideal shortest path and a number of hops in said ideal shortest path H for said first quadruplet;
   calculating said shortest available path and a number of hops in said shortest available path H* for said first quadruplet; and
   calculating said sub-optimality cost in accordance with the rate, said H and said H*.

7. The method of claim 5, said backtracking step comprising:
   creating a matrix that comprises a previous quadruplet configured for alteration and having all links between said source and said destination of said previous quadruplet in said subnetwork;
   one of (i) accepting said available shortest path of said first quadruplet if said matrix is empty, (ii) calculating a minimum value of a shifting cost of said previous quadruplet in accordance with said rate of said previous quadruplet in said subnetwork and a difference between a number of hops in said current path and said altered path for said previous quadruplet in said matrix and if said matrix is not empty, and (iii) accepting said available shortest path if said minimum shifting cost of said previous quadruplet exceeds said sub-optimality cost of said first quadruplet, wherein said altered path for said previous quadruplet is generated by deleting said previous quadruplet and adding said first quadruplet; and if said minimum shifling cost for said first quadruplet exceeds said sub-optimality cost for said previous quadruplet, (i) routing said previous quadruplet on a new path and resetting said available shortest path for said previous quadruplet to said new path, (ii) routing said first quadruplet on said shortest ideal path for said first quadruplet and (iii) resetting said available shortest part to said shortest ideal path for said first quadruplet, and configuring said first quadruplet to not be altered.

8. The method of claim 5, further comprising selecting a highest non-selected class from a plurality of differentiated service classes; and adjusting bandwidth availability of said network in accordance with said optimal path of said first quadruplet.

9. The method of claim 1, wherein said readjusting step comprises adjusting one of bandwidth availability wherein said domain comprises a Diffserv network, and optical wavelengths where said domain comprises an optical network.

10. A method of calculating an optimal path of a network, comprising:

selecting a highest non-selected class from a plurality of differentiated service classes;

listing all quadruplets for said selected class, wherein each of said quadruplets comprises a path having a source, a destination, a rate between said source and said destination, and an indicator of path alterability, wherein said quadruplets are sorted according to said rate;

selecting a first quadruplet that has not been rejected;

computing an optimal path between said source and said destination on a subnetwork of said network that comprises all paths meeting bandwidth availability requirements for said first quadruplet, said computing step comprising, calculating an ideal shortest path and a number of hops in said ideal shortest path H for said first quadruplet, calculating a shortest available path and a number of hops in said shortest available path H* for said first quadruplet, calculating a sub-optimality cost in accordance with the rate, said H and said H*, and one of accepting said shortest available path for said first quadruplet if said sub-optimality cost of said first quadruplet equals zero, and performing backtracking to determine if said ideal shortest path of said first quadruplet is feasible if said sub-optimality cost of said first quadruplet is greater than zero, said backtracking step comprising, creating a matrix that comprises a previous quadruplet configured for alteration and having all links between said source and said destination of said previous quadruplet in said subnetwork;

one of (i) accepting said available shortest path of said first quadruplet if said matrix is empty, (ii) calculating a minimum value of a shifting cost of said previous quadruplet in accordance with said rate of said previous quadruplet in said subnetwork and a difference between a number of hops in said current path and said altered path for said previous quadruplet in said matrix and if said matrix is not empty, and (iii) accepting said available shortest path if said minimum shifting cost of said previous quadruplet exceeds said sub-optimality cost of said first quadruplet, wherein said altered path for said previous quadruplet is generated by deleting said previous quadruplet and adding said first quadruplet, and if said minimum shifling cost for said first quadruplet exceeds said sub-optimality cost for said previous quadruplet, routing said previous quadruplet on a new path P* and resefting said available shortest path for said previous quadruplet to said new path P*, routing said first quadruplet on said shortest ideal path for said first quadruplet and resetting said available shortest part to said shortest ideal path for said first quadruplet, and configuring said first quadruplet to not be altered; and adjusting bandwidth availability of said network in accordance with said optimal path of said first quadruplet.

* * * * *